United States Patent [19]

Fuller

[11] Patent Number: 4,837,681
[45] Date of Patent: Jun. 6, 1989

[54] INSTRUCTION SEQUENCER BRANCH MECHANISM

[75] Inventor: William T. Fuller, San Jose, Calif.

[73] Assignee: Tandem Computers Incorporated, Cupertino, Calif.

[21] Appl. No.: 839,742

[22] Filed: Mar. 13, 1986

[51] Int. Cl.[4] .............................................. G06F 9/32
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,551,895 | 1/1968 | Driscoll | 364/200 |
| 3,764,988 | 10/1973 | Onishi | 364/200 |
| 3,987,416 | 10/1976 | Vandierendonck | 364/900 |
| 4,062,059 | 12/1977 | Suzuki et al. | 364/200 |
| 4,179,737 | 12/1979 | Kim | 364/200 |
| 4,354,231 | 10/1982 | Carlsson et al. | 364/200 |
| 4,354,232 | 10/1982 | Ryan | 364/200 |
| 4,654,786 | 3/1987 | Cochran et al. | 364/200 |
| 4,710,866 | 12/1987 | Zolnowsky et al. | 364/200 |

*Primary Examiner*—David Y. Eng
*Attorney, Agent, or Firm*—Townsend and Townsend

[57] ABSTRACT

A special-purpose, microprogrammed digital subsystem sequences through stored lists of microinstructions to produce various control signals. In response to address signals provided by an address generator, the microinstructions are accessed in pairs: A primary microinstruction and a branch or target microinstruction. For the most part, only the primary microinstruction is decoded and executed. However, certain of the ones of primary microinstructions are of the type that require a decision to be made, and the microinstruction stream branches to one of two choices depending upon the outcome of the decision. The target microinstruction forms the first microinstruction of one of the available microinstruction branches, and, if this branch is taken, is executed in parallel with the branch to avoid time penalties. An additional aspect of the invention is that the address generator, which provides address signals to a memory that stores the microinstructions, is capable of functioning as a timer circuit.

16 Claims, 2 Drawing Sheets

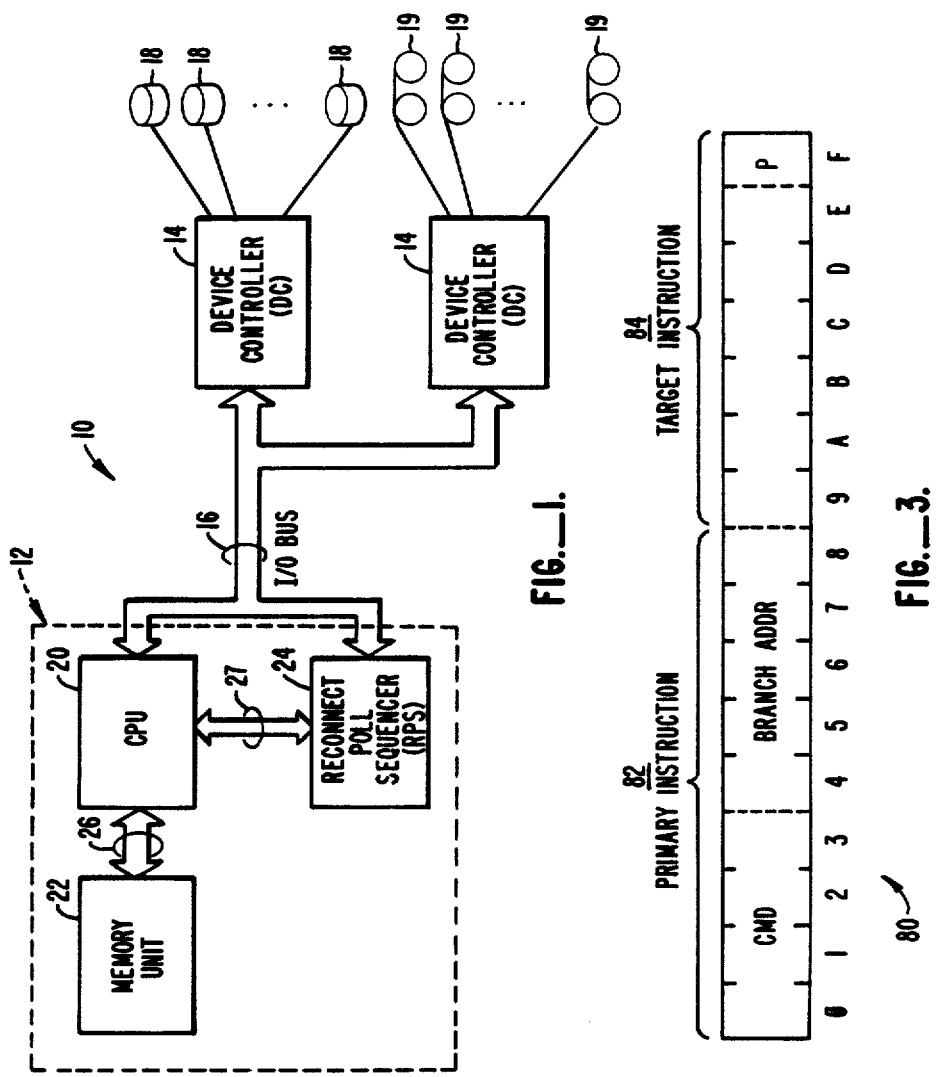

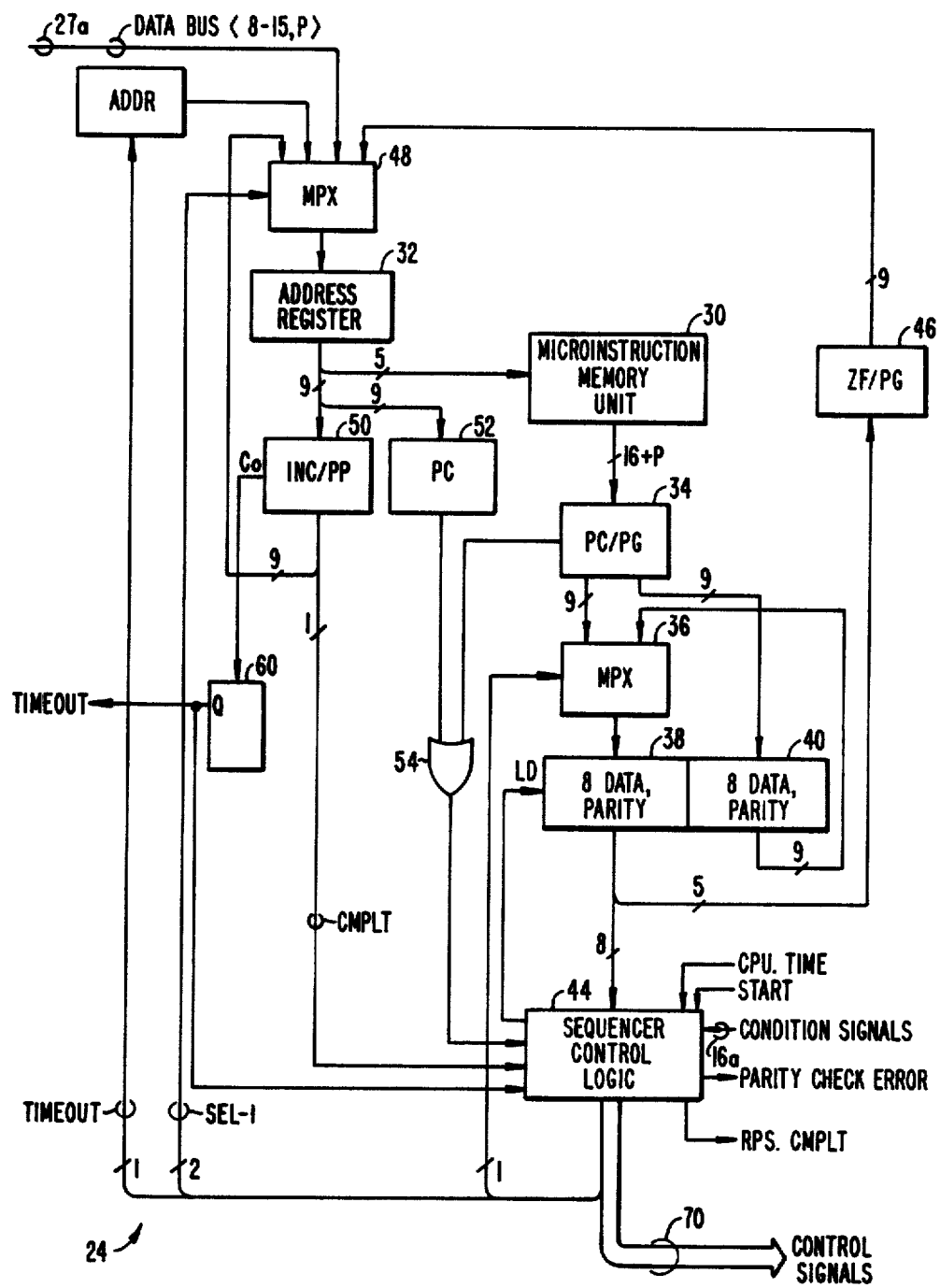
FIG._2.

INSTRUCTION SEQUENCER BRANCH MECHANISM

BACKGROUND OF THE INVENTION

The present invention is directed generally to digital computing systems, and more particularly to a special-purpose, microprogrammed digital subsystem that operates as an adjunct of a central processor unit (CPU) of a computing system to relieve the CPU of many of the functions it would otherwise have to perform. The invention functions in response to sequences of instructions to provide a variety of control signals, and to test for the existence or non-existence of a variety if digital conditions.

Computing systems of the type to which the present invention is directed often include a variety of peripheral units with which the system's CPU must communicate for transfers of data. Typically, when the CPU requests a data transfer from a peripheral unit such as a disk drive unit, it will initiate a data transfer request. A period of time ensues before the request is horored, during which the peripheral device readies itself for the data transfer and, when ready, notifies the CPU that the transfer can, or is about to, take place. Because of the disparity in operating speeds between a typical CPU and the usual peripheral device (i.e., keyboards, disk and tape drives, (and the like) it is an inefficient use of CPU time to have the CPU connected to the peripheral device for an entire period of a data transfer.

The promblem is compounded when a number of peripheral devices are requested to transfer data and two or more of the peripheral devices respond to the requests at approximately the same time. In that case, the CPU must take time to determine which peripheral device will be first, which will be later, and then stay on-line to handle all requests, keeping the CPU from its normal computing chores.

In order to increase efficiency of the computing system the CPU is often provided with specially designed state machines or similar apparatus to handle certain of these adjunct operations, allowing the CPU to continue to execute the main program. Thus, for example, where the CPU will issue an input/output data transfer request, it can turn over responsibility for set-up of that transfer to a special-purpose subsystem that notifies the CPU only when the CPU is needed for effecting the data transfer. The special-purpose subsystem is provided with only that intelligence necessary to test for the occurrence or non-occurrence of conditions precedent to data transfers. The primary advantage of this type of configuration is speed since, in effect, multiple events are performed in parallel.

Often, the subsystem must test for the presence of conditions, and branch in the instruction sequence depending upon the presence or absence of the condition. The branch can penalize operation in the number of cycles necessary to ultimately reach the target instruction. Present technology has sought to reduce branch penalties by including branch prediction capability, at the cost of sometimes substantial additional circuit components. Other approaches include fetching two instructions and, at the same time, choosing which to execute on the basis of a test condition. Again, this latter technique increases speed at the cost of component count.

SUMMARY OF THE INVENTION

The present invention is incorporated in a microprogrammed subsystem that operates to relieve a central processing unit (CPU) of many of the time-consuming chores associated with, for example, preparing for transfers of data between the CPU and peripheral devices that may be attached to the computing system controlled by the CPU. The invention itself, as incorporated in the subsystem, has two aspects: The first aspect is directed to reducing the time penalties often encountered by instructions or microinstructions that cause a branch from one instruction stream to another (usually based upon the existence or non-existence of a condition). The second aspect of the invention stems, in part, from the first aspect, and is directed to those classes of instructions or microinstructions that "loop" (i.e., pause and wait) for a predetermined period to wait for the appearance of a condition. This aspect uses the address generator (that provides addresses for a memory device) as a timer, resulting in a reduced component count for the subsystem.

According to the first aspect of the invention, microinstructions that direct operation of the subsystem are stored in a memory unit, and sequentially accessed therefrom in microinstruction pairs consisting of a primary microinstruction and a branch or target microinstruction. The primary and target microinstructions are respectively stored in a decode register and holding register. Only the primary microinstruction is decoded and executed—unless a branch is to be effected. If the primary microinstruction is a branch instruction, such as a branch-on condition TRUE, and the condition tests TRUE, the target microinstruction is transferred to the decode register at the same time a portion of the primary microinstruction is transferred to the address register to form the address of the microinstruction to follow the target microinstruction, which, in turn, is sequentially followed by the rest of the branched-to microinstruction sequence. Thus, the target microinstruction is, in fact, the first microinstruction of the microinstruction sequence to which a branch is made when a tested condition so indicates. On the other hand, if the condition tests FALSE, no branch is taken, and normal instruction sequencing continues.

Certain of the branch microinstructions are a "loop" type of microinstruction that will test for the presence of a condition and, if present, will effect a branch in the manner described above. If the condition is not present, however, the loop microinstructions will function by awaiting the appearance of a condition for a period of time. If the condition appears during that period, a branch is executed according to the first aspect of the invention. If the condition does not appear, the apparatus halts and provides an indication of non-appearance of the condition tested. It is the second aspect of the invention that performs the timer function to set the time period within which the condition must appear in order for the branch to be taken.

According to the second aspect of the invention the address generator is structured to operate as a timer, in addition to its operation of providing address signals to sequentially access the microinstruction pairs from the memory unit of the subsystem. When a loop type of microinstruction is encountered the address generator is switched to its timer mode, and begins incrementing from a count that was formerly an address of the loop microinstruction toward a time-out count. If a looked-for condition appears before the time-out count is reached, the branch is effected in the manner described; if not, the subsystem sets a latch, indicating time-out, and terminates operation.

An additional feature of this second aspect is that the address register is made accessible to the CPU. Thus, the address register can be preset with a start count by the CPU, and the subsystem operated, by the CPU, as a variable timer.

A number of advantages are achieved by the present invention. With respect to the first aspect, there are no lost cycles, as is normally the case, in executing a branch microinstruction. By providing each branch microinstruction with the branch—to (i.e., target) microinstruction (by accessing pairs of the instructions from the memory), a memory access is not needed in order to effect the branch; rather, the immediate availability of the branch-to-microinstruction obviates any need to access memory. The next microinstruction in the microinstruction sequence of the branch is accessed using a portion of the content of the branch microinstruction itself. Branch execution is just as fast as non-branch execution.

With respect to the second aspect of the invention, by utilizing the address register as a timer, supplemental timer circuitry is not necessary.

These and other advantages will become apparent to those skilled in the art upon a reading of the following detailed description of the invention, which should be taken in conjunction with the accompanying drawings.

BRIEF DESCRIPTION OF THE DRAWINGS

FIG. 1 is an illustration of a subsystem incorporating the present invention, in use to assist in data transfers between a CPU and external peripheral devices of the system;

FIG. 2 is a detailed block diagram of the subsystem of FIG. 1, to illustrate the aspects of the invention; and FIG. 3 illustrates the structure and content of a microinstruction pair used by the present invention.

DETAILED DESCRIPTION OF THE INVENTION

The present invention is incorporated in a subsystem designed to assist in communicating data between a central processing unit (CPU) and external peripheral devices that form part of a computing or data processing system of the type broadly illustrated in FIG. 1 and designated with the reference numeral 10. As so illustrated, the data processing system 10 includes a processor unit 12 that is couple to two or more device controllers 14 by an input/output (I/O) bus 16. I/O bus 16 permits data communication between the processor 12 and a number of peripheral devices, such as disk storage units 18 or tape units 19, via the associated device controllers (DC) 14. The I/O bus 16 includes a data bus on which the data is transferred, and addition bus structure (i.e., signal lines) that communicate various "handshake" signals to set up, conduct, and terminate data communications in orderly fashion, according to predetermined protocol.

The processor unit 12 itself broadly includes a central processing unit (CPU) 20, a memory unit 22, a subsystem in the form of a reconnect poll sequencer (RPS) 24. An address and data bus structure 26 interconnect the CPU 20, memory unit 22, and a central bus 27 interconnects the CPU 20 and RPS 24. The I/O bus 16 connects to the CPU 20, and a portion 16a of the I/O bus 16 is coupled to the RPS 24.

Broadly, the data processor system 10 functions in the following manner for data transfers between the processor 12 and a peripheral unit 18 or 19: A data transfer is initiated by the CPU 20 when a transfer request is issued to the device controller 14 with which the peripheral device that will be involved in the transfer is associated. The transfer request will include information identifying the direction of transfer and the location of the data to be transferred to or from.

Thereafter, the device controller 14 will act upon the request by signaling the subject peripheral device 18 (or 19) that will be involved, and begin communication with that device, ultimately responding to the request with a reconnect interrupt (RCI) signal to indicate that it, and its associated peripheral device 18, are ready for the data transfer.

Often, although not specifically shown in FIG. 1, there are a larger number than two of the device controllers 14 attached to the I/O bus 16, and there may be multiple requests within a short period of time made by the CPU 20 for data transfers. It is possible, therefore, that an RCI signal, indicating readiness for a data transfer, will be issued by several of the device controllers 14 that are attached to the I/O bus 16. In this case, the processor unit 12 may not know which of the device controllers 14 sent the RCI signal, and must "poll" the device controllers 14 to determine which of them has a peripheral device ready for a data transfer and, if more than one, determine, according to a priority schedule, which of the peripheral devices should communicate first with the CPU 20, which second, and so on. The amount of time to make this determination and to prepare for the actual data transfer can be substantial in terms of CPU 20 operating time.

Accordingly, it is the function of the RPS 24 to act upon the various handshake signals that take place across the I/O bus 16, after a data communication request has been made by the CPU 20, to allow the CPU to do other things until it is called upon to handle or otherwise become involved in the data transfer. Thus, in the example outlined above, it would be the function of the RPS 24 to respond to one or more RCI signals to determine (1) which peripheral devices 18, 19 are requesting service, (2) the direction of the data transfer, and (3) to notify the CPU 20 just before (yet with sufficient time to allow the CPU 20 to act) the data transfer is actually to take place.

Referring now to FIG. 2, the RPS 24 is shown in greater detail incorporating the teachings of the present invention. As illustrated, the RPS 24 includes a microinstruction memory unit 30 that stores pairs of eight-bit microinstructions, an 8-bit primary microinstruction and an 8-bit target microinstruction together with a parity bit, and sequentially issues those pairs of microinstructions in response to address signals generated by an address register 32. The pairs of microinstructions (plus parity) are passed through a parity check/parity generating PC/PG circuit 34 where parity on the microprocessor pair is first checked, and then parity generated for each separate 8-bit microinstruction. From the PC/PG circuit 34, the primary microinstruction (with its one bit of parity) is passed through a multiplex circuit 36 and loaded in a 9-bit decode register 38, and the target microinstruction is placed in a 9-bit holding register 40. The output of the holding register 40 is coupled back to one of the two data inputs of the multiplex circuit 36.

The 8-bit primary microinstruction contained in the decode register 38 is applied to a sequencer control logic 44, while five bits of the decode register 38 output is communicated to a zero fill/parity generate (ZF/PG) circuit 46. The ZF/PG circuit 46 functions to pad the incoming five bits with an additional three bits of ZERO (in the most significant bit positions), and add a parity bit, forming a 9-bit word that is coupled to a multiplex circuit 48. Under control signals from the sequencer control logic 44 the output of the ZF/PG circuit 46 is selected for presetting the address register 32 when executing a branch in the microinstruction sequence, as will be described in greater detail hereinafter.

The content of the address register 32 is applied to an increment and parity predict (INC/PP) circuit 50 that, for each pass therethrough, first looks at the incoming address to be incremented, predicts what parity will be for the incremented address, increments the address, and adds the predicted parity thereto. The incremented address, with parity, is then returned to, through the multiplex circuit 48, and loaded in the address register 32 to address the next sequential microinstruction pair in the memory unit 30. By predicting parity from the address to be incremented, rather than generating parity from the incremented address, a check of the incrementing portion of the INC/PP 50 is maintained.

The memory unit 30 is configured to contain 32 pairs of instructions. Accordingly, only five bits of the content of the address register 32 are used to form the address signals applied to the memory unit 30. Obviously, if a larger memory unit 30 were used, additional ones of the bits of the address register 32 could be used.

The address that is applied to the INC/PP circuit 50 is simultaneously applied to a parity checking circuit 52. If parity is found to be incorrect, the parity check circuit 52 generates an output that is coupled to the sequencer control logic 44, via an OR gate 54, as an error signal. In similar fashion, an error signal, indicating incorrect parity, may also be generated by the PC/PG circuit 34 and communicated to the OR gate 54. If a parity error is found, the SEQUENCER CONTROL LOGIC 44 will terminate operation, and issue a PARITY CHECK ERROR signal that is communicated to the CPU.

In addition to generating the incremented address and parity, the INC/PP circuit 50 also produces a complete (CMPLT) signal that signifies when the memory unit 30 has cycled through its complement of microinstruction pairs. The CMPLT signal is generated when, during incrementing, a carry-out of the five low-order bit positions of the address word is experienced. The CMPLT is applied to the sequencer control logic to halt the RPS 24, until called upon again to perform a reconnect sequence.

In addition to the CMPLT signal, a second signal is created by the INC/PP circuit 50 when the address register 32 is operating in a timer mode: A carry-out ($C_o$) signal is generated when an incrementation of the address produces a carry-out of the most significant bit position. The $C_o$ signal is used to set a latch 60 to generate a TIMEOUT signal that indicates to the CPU 20, via the bus 27 (FIG. 1), that RPS 24 has reached a time-out condition while operating in a timer mode. In addition, the TIMEOUT signal is applied to the sequencer control logic 44 to freeze operation of the RPS 24.

FIG. 3 illustrates the basic structure of the microinstruction pairs stored in the memory unit 30. As can be seen, the microinstruction pair, designated with the reference numeral 80, comprises two microinstructions a primary microinstruction 82 and a target microinstruction 84. The bit position F (hex) of the microinstruction pair 80 is the parity bit (P) covering the microinstruction pair 80. "Branch" or "Loop" microinstructions are contained in bit positions $\phi$–8 of the microinstruction pair 80, accompanied by the target microinstruction in bit positions 9–E; all other microinstructions are contained in bit positions $\phi$–7, accompanied by zeros in the remaining bit positions 8–E.

Branch or Loop microinstructions are distinguished from those microinstructions that do not effect a change in the microprogram sequence by a ONE in the bit $\phi$ position. The type of branch to be taken is identified by the information contained in bit positions 1–3.

The RPS 24 operates in three basic modes when called from its idle state by the CPU 20: In a first mode the RPS 24 operates solely as a timer. The address register is accessible to the CPU 20 via the bus connection 27 (FIG. 1), and the MPX unit 48 (switched by the sequencer control logic 44 in response to a CUP.OVRD signal from the CPU 20 — which also initiates this mode of operation). Thus, timer operation can start from any present specified by the CPU 20, and continues until the $C_o$ signal is generated by INC/PP circuit 50 or until the time-out condition appears. If the time-out condition does not appear, the $C_o$ signal sets latch 60 to bring up the TIMEOUT signal and freezes operation of the RPS 24.

This first mode of operation of the RPS 24 is used by the CPU 20 when it desires to test for the existence, or appearance within predetermined time periods, of certain conditions. In essence, the CPU 20 will start the RPS 24, setting a count in the address register 32, and go into a loop condition, continously testing for a condition. If the looked-for condition appears before the $C_o$ signal is generated by the INC/PP 50, the CPU 20 breaks out of its loop, resets the RPS 24 (to an idle state, for example), and proceeds processing. If the looked-for condition does not appear the TIMEOUT signal will break the CPU out of its loop.

A second mode is normal programmed operation, also initiated by the CPU 20, through a START signal. During this mode microinstruction pairs are sequentially accessed from the memory unit 30 in response to an address sequence produced by the address register 32/incrementer 50 combination. No disruption of the microinstruction sequence is effected. As the microinstruction pairs are accessed and loaded in the decode and holding registers 38 and 40, respectively, only the primary microinstruction is decoded and executed, periodically causing control signals to be issued from the sequencer control logic on bus 70. When the RPS 24 completes the task it was called upon to perform the address register will be incremented to a maximum memory address count, generating the CMPLT signal. The RPS 24 then idles at this maximum memory address count until started for another task. The CPU 20 can test the state of the RPS 24 by the signal RPS.CMPLT (generated when the idle state is assumed).

The third mode of operation involves testing for the presence or absence of various "handshake" or condition signals. This mode is entered when, during normal (mode two) operation a "test and branch" or a "wait" (primary) microinstructions is encountered in the microinstruction sequence. In the first case, a test is made for the presence of a condition (specified by the microinstruction command-bit positions 1-3). If the test is TRUE a branch from the normal microinstruction sequence is effected; if not, normal sequencing continues. In the wait type of instruction, the RPS 24 halts to determine if the condition becomes TRUE within a predetermined time period. If also, a branch is effected; if not, operation halts and TIMEOUT is brought up.

The primary branch (or wait) type of microinstruction is accompanied by a target microinstruction to be executed if the test condition in TRUE. Thus, when a branch is effected, the target instruction becomes the first instruction of the branched-to sequence. This is accomplished as follows: The content of the holding register 40 is passed through the multiplex 36, under control of the sequencer control logic 44, and loaded into the decode register 38. At the same time, bits 4–8 of the primary microinstruction are communicated through the zero fill/parity generating circuit 46 and the multilex circuit 48 to be loaded into the address register 32, forming the address of the microinstruction that will immediately follow the target microinstruction that now resides in the decode register 48.

If it is a wait instruction that is executed, and the condition does not become TRUE before the $C_o$ signal is generated, the RPS freezes.

Signal lines 16a from the I/O bus 16 conduct condition signals (i.e., handshakes signals) to the sequencer control logic 44 that are used to direct operation of the RPS 24 in the manner described above. To summarize: certain of the microinstructions test for the existence of a condition and, depending upon the outcome of the test, will "branch" to execution the target microinstruction contained in the holding register 40 or continue with the next sequential microinstruction. Conversely, the wait (or loop) microinstructions will halt operation if the condition sought is not yet present, using the address register 32 as a timer. If the sought-after condition appears before a predetermined period, the branch will be taken; if not, the $C_o$ signal will be generated by the incrementing and parity generating circuit 50, and the RPS will "freeze" until reset by the CPU 20.

The primary advantages of the present invention should now be more apparent. First, branches are executed without the usual penalty of having to perform the series of steps of: (1) Loading the address register 32, (2) initiating a read of the memory unit 30, (3) loading the decode register 38, and then (4) decoding the instruction. To the contrary, if a branch proves necassary, the target instruction is immediately transferred from the holding register 40 to the decode register 38 for decoding and execution. While this is occurring, the transfer of a portion of the previous instruction to the address register 32, forming the next sequential instruction in the branched-to sequence.

In addition, when timer functions are needed, the address register can function as a timer without added circuitry.

Accordingly, while the above provides a full and complete disclosure of the present invention, it will be obvious to those skilled in the art that modifications and alterations of the disclosed invention can readily be implemented without departing from the scope and spirit of the invention. For example, the address register 32 may be constructed using a binary counter, if parity is not important. Pipelining of the microinstruction that are accessed from the memory scope and spirit of the present invention.

It should be understood, therefore, that the scope of the invention is limited only by the breadth of the claims.

I claim:

1. Digital apparatus, comprising:
   memory means for containing a plurality of instructions;
   address means coupled to the memory means for providing address signals causing pairs of the instructions, comprising a primary instruction and a target instruction, to issue simultaneously from the memory means;
   register means for receiving and temporarily storing the pairs of instructions, the register means including a first and a second portion for respectively storing the primary and target instruction;
   decoding means coupled to the first portion of the register means for interpreting the primary instruction to provide control signals therefrom, the decoder means including a first circuit means for receiving at least one condition signal; and
   a second circuit means coupled to the register means and responsive to decoding of certain ones of the primary instructions by the decoder means and to presence of the condition signal for transferring the target instruction to the first portion of the register means.

2. The apparatus of claim 1, the second circuit means including means for transferring a segment of the primary instruction to the address means to form address signals for accessing the memory means.

3. The apparatus in claim 1, including timer means operable to be initiated by the decoder means when certain of the primary instructions are interpreted for generating a time-out signal when the condition signal is absent for a predetermined period of time, the time-out signal for causing the address means to provide address signals to cause a next pair of instructions to issue from the memory means.

4. The apparatus of claim 3, the address means further comprising an incrementing means for incrementing a value held by the incrementing means and further wherein the address means functions also as said timer means.

5. In digital apparatus of the type operable to execute sequences of microinstructions supplied by a memory means in response to address signals from an address generating means, the apparatus having means functioning to generate control signals, and to respond to the presence of at least one condition signal, the improvement comprising the method of:
   sequentially accessing pairs of the microinstructions from the memory means simultaneously, each pair including of a primary microinstruction and a target microinstruction;
   decoding the primary microinstruction of each of the accesed pairs of microinstructions;
   responding to predetermined ones of the decoded primary microinstructions and to the presence of the condition signal to transfer a portion of the corresponding primary microinstruction to the address generating means as an address of a next sequential microinstruction pair and, at substantially the same time, to decode the target microinstructions of the pair of microinstructions.

6. The method of claim 5, including the step of holding the responding step, in absence of the condition signal, for (1) appearance of the condition signal or (2) appearance of a time-out signal indicative of expiration of a predetermined time period, whichever occurs first.

7. The method of claim 6, including the step of generating the time-out signal upon expiration of the predetermined time period.

8. The method of claim 5, including the step of, in the absence of the condition signal, accessing a next sequential pair of the microinstructions from the memory means.

9. Digital apparatus, comprising:
memory means for containing a plurality of pairs of instructions, each pair of instructions including a primary instruction and a target instruction;
address means coupled to the memory means for providing address signals causing pairs of the instructions to issue substantially simultaneously from the memory means;
register means for receiving and temporaily storing the pairs of instruction, the register means including a first and a second portion for respectively storing the primary and target instructions;
decoding means coupled to the first portion of the register means for interpreting the primary instruction to provide control signals therefrom, the decoder means including a first circuit means for receiving at least one condition signal; and
second circuit means coulped to the register means and responsive to decoding of certain ones of the primary instructions by the decoder means and to the presence of the condition signals for communicating the target instruction to the decoding means for interpreting the target instruction, the second circuit means including means for transferring at least a segment of the primary instruction to the address means substantially simltaneous with the communication of the target instruction to the decoding means to form address signals for accessing the memory means.

10. Digital apparatus, comprising:
memory means for storing a plurality of primary instructions and target instruction;
address means coupled to the memory means for providing address signals causing a primary instruction and a target instruction to issue in parallel from the memory means;
register means, including first and second portions for receiving and temporaily storing the primary and target instructions, respectively;
control means coupled to the first portion of the register means for interpreting the primary instruction to provide control signals therefrom, the control means including a means for receiving at least one condition signal;
circuit means coupled to the register means and responsive to the interpreting of certain ones of the primary instructions by the control means and to the presence of the condition signal for transferring the target instruction to the first portion of the register means; and,
timer means operable to be initiated by the control means when the certain ones of the primary instructions are interpreted for generating a time-out signal when the condition signal is absent for a predetermined period of time, the time-out signals for causing the address means to provide address signals to cause pairs of instructions to issue from the memory means.

11. The digital apparatus of claims 10, including means for presetting the timer means to a value indicative of the period of time.

12. The digital apparatus of claim 10, wherein the timer means includes presettable counter means operable to determine the period of time.

13. The digital apparatus of claim 12, including means for presetting the presettable counter means to predetermined values.

14. Digital apparatus comprising:
memory means for storing a plurality of pairs of instructions, each of the pairs of instructions comprising a primary instruction and a target instruction;
address means coupled to the memory means for providing address signals causing the pairs of instructions to sequentially issue from the memory means;
first and second register means for receiving and temporarily storing the primary and target instructions, respectively;
control means coulped to the first and second register means for interpreting the primary instruction to provide control signals therefrom, the control means including means for receiving at least one condition signal; and
circuit means coupled to the first and second register means and responsive to the control signals and to the presence of the condition signal for transferring the target instruction to the first register means.

15. The digital appartus of claim 14, including timer means operable to be initiated by the control means when certain of the primary instructions of certain of the pairs of instructions are interpreted and the control signal is not present for generating a time-out signal for causing the address means to provide address signals to cause pairs of instructions to issue from the memory means when the condition signal has not appeared after a predetermined period of time.

16. The digital apparatus of claim 15, wherein the timer means includes a presettable counter.

* * * * *